United States Patent
Dornbusch

(12) 
(10) Patent No.: US 7,200,373 B2
(45) Date of Patent: Apr. 3, 2007

(54) ANTENNA DETECTION AND DIAGNOSTIC SYSTEM AND RELATED METHOD

(75) Inventor: Andrew W. Dornbusch, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 445 days.

(21) Appl. No.: 10/681,604

(22) Filed: Oct. 8, 2003

(65) Prior Publication Data

US 2005/0059359 A1    Mar. 17, 2005

Related U.S. Application Data

(60) Provisional application No. 60/503,010, filed on Sep. 15, 2003.

(51) Int. Cl.
*H04B 1/16* (2006.01)

(52) U.S. Cl. .................. 455/217; 455/226.1; 455/230; 455/269; 455/272; 455/334

(58) Field of Classification Search ................ 455/217, 455/226.1, 230, 269, 270, 272, 280, 334
See application file for complete search history.

(56) References Cited

U.S. PATENT DOCUMENTS

| | | | | |
|---|---|---|---|---|
| 4,536,699 A | | 8/1985 | Baker ..................... 323/276 |
| 5,239,669 A | * | 8/1993 | Mason et al. ............. 455/12.1 |
| 5,430,769 A | | 7/1995 | Patsiokas et al. .......... 375/347 |
| 5,545,970 A | | 8/1996 | Parkes, Jr. et al. ......... 323/277 |
| 5,578,916 A | | 11/1996 | Muterspaugh ............. 323/267 |
| 5,721,774 A | * | 2/1998 | Stiefel ..................... 379/413 |
| 5,839,060 A | * | 11/1998 | Kasperkovitz et al. ... 455/226.2 |
| 5,977,920 A | | 11/1999 | Hung ...................... 343/715 |
| 6,163,712 A | * | 12/2000 | Winkler et al. ............ 455/572 |
| 6,622,013 B1 | | 9/2003 | Miyoshi et al. .......... 455/277.2 |
| 6,928,281 B2 | * | 8/2005 | Ward et al. ................ 455/423 |
| 6,980,116 B2 | | 12/2005 | Hagen ..................... 340/653 |
| 6,996,389 B2 | * | 2/2006 | Fitzpatrick et al. ....... 455/343.1 |
| 2002/0003493 A1 | * | 1/2002 | Durst et al. ............. 342/357.07 |
| 2002/0008667 A1 | | 1/2002 | Nguyen et al. ............. 343/715 |
| 2002/0132644 A1 | * | 9/2002 | Mellor et al. ............... 455/562 |
| 2002/0167042 A1 | | 11/2002 | Angle et al. ............... 257/315 |
| 2003/0087626 A1 | * | 5/2003 | Prikhodko et al. ......... 455/341 |

OTHER PUBLICATIONS

International Search Report; PCT/US2004/030218; Jan. 25, 2005; 11 pgs.

* cited by examiner

*Primary Examiner*—Nay Maung
*Assistant Examiner*—Richard Chan
(74) *Attorney, Agent, or Firm*—O'Keefe, Egan, Peterman & Enders, LLP

(57) ABSTRACT

An antenna detection and diagnostic system and associated method, including current and voltage detection circuits, are disclosed for detecting antenna failure mechanisms for integrated radio receivers. Integrated current limit detection circuitry is disclosed that determines current levels drawn by a remotely mounted antenna and generates a drive signal that controls a current limiting pass transistor such that current flow through the transistor is reduced when the detected current level drawn antenna rises above a current limit level. Integrated current and voltage detection circuitry is disclosed that detects current and voltage levels drawn by a remotely mounted antenna and determines under-current, over-current, and over-voltage antenna error conditions. At least one antenna error output pin for the integrated radio receiver is then used provide an output signal indicative of antenna error conditions.

34 Claims, 4 Drawing Sheets

US 7,200,373 B2

ANTENNA DETECTION AND DIAGNOSTIC SYSTEM AND RELATED METHOD

RELATED APPLICATIONS

This application claims priority to the following co-pending provisional application: Provisional Application Ser. No. 60/503,010, which was entitled "SATELLITE RADIO RECEIVER" and was filed on Sep. 15, 2003.

TECHNICAL FIELD OF THE INVENTION

This invention relates to antenna error detection systems and more particularly to error detection architectures for vehicle antennas directed to satellite radio signal spectrums and associated terrestrial repeaters.

BACKGROUND

Certain error conditions can occur when one or more antennas are connected to electrical systems and integrated circuits. These error conditions can include, for example, conditions where the antenna subsystems are drawing too much current or too little current. These error conditions can also include conditions where the voltages associated with signals from the antenna subsystems are too high.

One example of an environment where remote antenna subsystems are utilized is a vehicle, such as an automobile, having one or more radio antennas mounted or connected to the vehicle. These antennas receive radio frequency signals that are fed to audio circuitry in the vehicle. The audio circuitry processes these signals and ultimately provides audio outputs to those persons traveling in the vehicle. Audio programming often received by vehicles include AM/FM radio signals. More recently, vehicles have been equipped with antennas and audio circuitry to receive and process satellite-based radio signals and associated signals from terrestrial repeaters, such as those signals broadcast by XM Satellite Radio. It is also noted that with respect to satellite-based receivers for vehicles, multiple vehicle antennas have been used with one antenna being designed to better receive the signals from satellites and another antenna being designed to better receive signals from terrestrial repeaters. For radios with remotely mounted antennas in particularly adverse environments, such as with antennas mounted on automobiles, it is advantageous to be able to detect and diagnose electronically various antenna failure mechanisms.

SUMMARY OF THE INVENTION

The present invention is an antenna detection and diagnostic system and associated method that provides an effective solution for detecting antenna failure mechanisms.

In one aspect, the present invention provides an antenna error detection and circuit protection system including a current limit detection circuit integrated within an integrated radio receiver and configured to detect current levels drawn by at least one antenna mounted remotely from the integrated radio receiver where the current limit detection circuit having a gate drive signal as an output, and a current limiting pass transistor having its source and drain coupled between a supply voltage and an antenna and having its gate coupled to the gate drive signal, such that the current limit detection circuit is configured to adjust the gate drive signal to reduce current flow through the pass transistor when the detected current level drawn by the at least one antenna rises above a current limit level. As described below, other features and variations can be implemented, if desired, and a related method can be utilized, as well.

In another aspect, the present invention provides an antenna error detection and circuit protection system including a current and voltage detection circuit integrated within an integrated radio receiver and configured to detect current and voltage levels drawn by at least one antenna mounted remotely from the integrated radio receiver where the current and voltage detection circuit configured to determine under-current, over-current, and over-voltage antenna error conditions, and at least one antenna error output pin for the integrated radio receiver such that the antenna error output pin provides an output signal indicative of an antenna error condition. As described below, other features and variations can be implemented, if desired, and a related method can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides an effective solution for detecting antenna failure mechanisms by providing an efficient and advantageous architecture for an antenna detection and diagnostic system.

Figure 1:
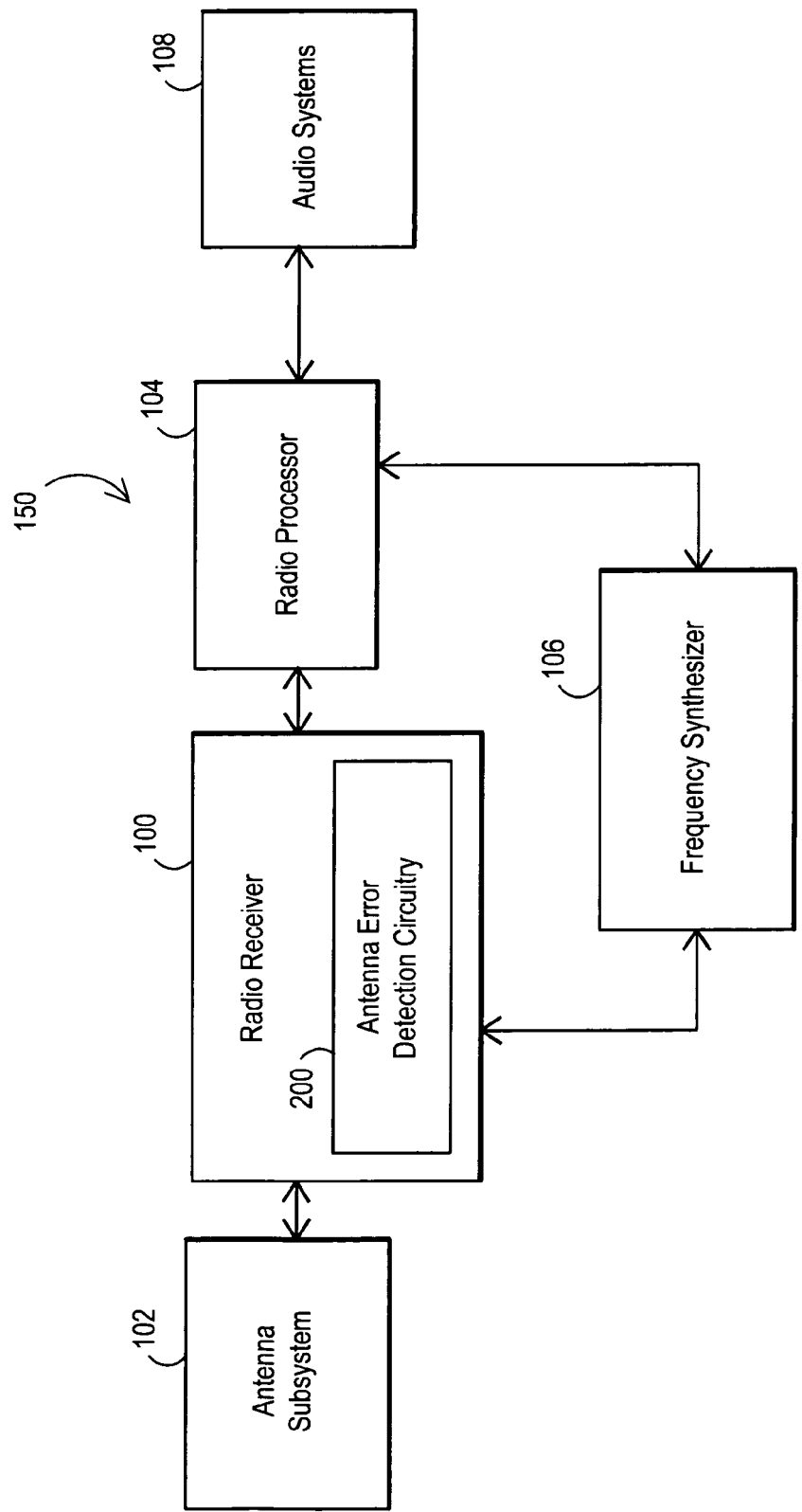
FIG. 1 is a block diagram for a system including a radio receiver with antenna error detection circuitry.

FIG. 1 is a block diagram for a system 150 including a radio receiver 100 with antenna error detection circuitry 200. An antenna subsystem 102 communicates with the radio receiver 100 and provides radio frequency signals including audio programming. The radio receiver 100 communicates with a frequency synthesizer 106 that provides mixing signals utilized by the radio receiver 100 to tune selected channels within the input signal spectrum. The radio receiver then provides tuned output signals to the radio processor 104. The radio processor 104 processes these tuned signals and produces output signals utilized by audio systems 108 to provide the audio programming to the radio user. The radio processor 104 also communicates with the frequency synthesizer 106 to control the output mixing signals provided to radio receiver 100, for example, in response to radio channel selections made by the user.

Figure 2:
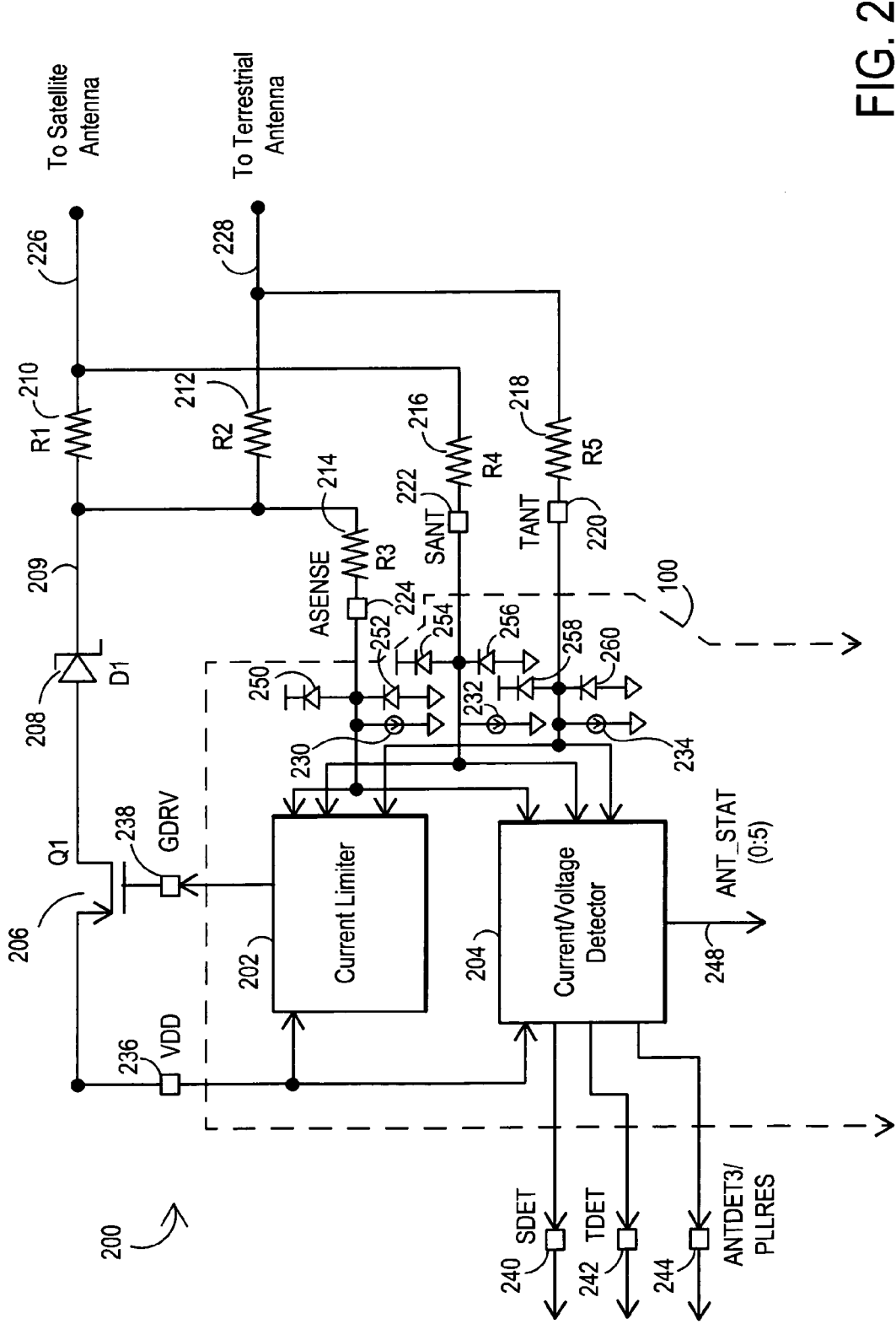
FIG. 2 is a more detailed diagram for an example embodiment of the antenna detection circuitry, including a current limiter block and a current/voltage detector.

FIG. 2 is a more detailed diagram for an example embodiment of the antenna detection circuitry 200, including a current limiter block 202 and a current/voltage detector 204. In the embodiment depicted, dotted line 100 represents the boundary of a radio receiver integrated circuit. Elements 220, 222, 224, 236, 238, 240, 242 and 244 represent external pins. It is also noted that the embodiment in FIG. 2 is directed to an automobile environment in which satellite radio signals are being received. In addition, this embodiment, as depicted, assumes that there are two antennas mounted on the vehicle with one antenna being optimized to receive signals from satellites and the other being optimized for receiving signals from a terrestrial repeater. It is noted that the current invention is applicable for single antenna environments, as well. And in such an environment, the second antenna input pin, such as pin 220, can be left unused, can be coupled to ground or a supply voltage, and/or can be coupled to the other input pin 222, as desired.

The current limiter circuitry 202 is coupled to receive power from the voltage supply, which is input to the integrated circuit 100 through external pin ($V_{DD}$) 236, and to provide a gate driving voltage (GDRV) to a current limiting transistor (Q1) 206 through an external pin (GDRV) 238. The source of the current limiting transistor 206 is coupled to the supply voltage pin ($V_{DD}$) 236, and the drain of the current limiting transistor 206 is coupled to a voltage drop device, such as Schottky diode (D1) 208. A first external resistor (R1) 210 is coupled between the output node 209 of diode 208 and node 226, which is in turn coupled to the satellite antenna subsystem. And a second external resistor (R2) 212 is coupled between the output node 209 of diode 208 and node 228, which is in turn coupled to the terrestrial antenna subsystem. The two external resistors (R1, R2) 210 and 212 are selected to be matched resistors and are selected to determine the current limit levels, as described in more detail below. (It is noted, however, that these resistors (R1, R2) 210 and 212 may be non-matched, if desired, and their values may be significantly different depending upon the particular antenna implemented.) The output node 209 of the diode 208 is also coupled through a third external resistor (R3) 214 to the antenna sense (ASENSE) input pin 224. The satellite antenna node 226 is coupled through a fourth external resistor (R4) 216 to the satellite antenna (SANT) monitor pin 222. And the terrestrial antenna node 228 is coupled through a fifth external resistor (R5) 218 to the terrestrial antenna (TANT) monitor pin 220. The resistors (R3, R4, R5) 214, 216 and 218 are selected to be matched resistors and are selected to provide current and overvoltage protection for the integrated circuit 100. In addition, as depicted, electrostatic discharge (ESD) protection diodes 250, 252, 254, 256, 258, and 260 are coupled to the input pins (ASENSE) 224, (SANT) 222 and (TANT) 220, respectively, to provide further over-voltage and ESD protection. On-chip current sinks 230, 232, and 234 are used to create a voltage potential across resistors 214, 216, and 218. The current limiter circuitry 202 is coupled to receive input signals from the input pins (ASENSE) 224, (SANT) 222 and (TANT) 220, an example for which is described in further detail below.

The current/voltage detector circuitry 204 is also coupled to receive input signals from the input pins (ASENSE) 224, (SANT) 222 and (TANT) 220. In the embodiment depicted, current/voltage circuitry 204 also outputs antenna status signals (ANT_STAT) 248 that provide six bits of data (0:5) for an antenna status register that can be included within the integrated circuit 100. The current/voltage detector circuitry also provides output signals to a satellite antenna error detect (SDET) pin 240, a terrestrial antenna error detect (TDET) pin 242, and a third antenna error detect (ANTDET3/PLLRES) pin 244. The example for the current/voltage detector circuitry 204 is described in further detail below. The possible dual use of ANTDET3/PLLRES pin is also described in further detail below.

In operation, the circuitry of FIG. 2 provides efficient and advantageous antenna error detection and circuit protection features. This circuitry detects and distinguishes between a variety of failure mechanisms, such as antenna open circuit failures (under-current condition), antenna short to ground failures (over-current condition) and antenna short to supply failures (over-voltage condition). In addition, this circuitry acts to help prevent damage to the radio system in the case of an external short or over-voltage condition.

With respect to current limiting and voltage protection functionality, the pass transistor (Q1) 206 provides current limiting protection, and the diode (D1) 208 provides over-voltage protection for transistor 206. The three resistors (R3, R4, R5) 214, 216 and 218 are voltage drop resistors and serve two primary purposes: (1) to limit the current flow through the pad ring protection diodes 250, 252, 254, 256, 258, and 260 during over-voltage situations and (2) to provide about 0.5 volts of a voltage drop during over-voltage events making it easier to distinguish between normal operation and over-voltage errors. In addition, these resistors can be integrated within the integrated radio receiver 100, if desired. Within the current limiter circuitry 202, the TANT signal 220, the SANT signal 222 and the ASENSE signal 224 are monitored to generate the GDRV signal 238 that drives the current limiting transistor (Q1) 206. In particular, the voltage differences ASENSE-SANT and ASENSE-TANT are compared to a reference voltage that is configured to be equal to Vlimit=Ilimit / Rsense, where Rsense is the values selected for resistors (R1, R2) 210 and 212. When either voltage difference exceeds the voltage limit (Vlimit), then the current limiting pass transistor (Q1) 206 is turned partially off or potentially completely off, depending upon the conditions, thereby limiting the maximum current draw for the antenna outputs. These current limiting is advantageous and, for example, helps prevent circuit damage due to external shorts. With respect to example device parameters, the three resistors (R3, R4, R5) 214, 216 and 218 can be selected to be about 10K ohms. The diode (D1) 208 can be a surface-mount Schottky rectifier, such as part number 10BQ015 available from International Rectifier, and the pass transistor (Q1) 206 can be a power MOSFET, such as part number IRLML6401 also available from International Rectifier.

With respect to current detection functionality, the two resistors (R1, R2) 210 and 212 are selected for current sensing capabilities. Internally within the current/voltage detector circuitry 204, the voltage differences ASENSE-SANT and ASENSE-TANT are compared to two reference voltages. One reference voltage is configured to equal to Vmax=Imax/Rsense, such that the output of the comparison indicates whether the current is over a selected current limit (Imax). If the antenna current exceeds this maximum current limit, then it can be inferred that the antenna has been shorted to ground or that active circuitry has failed, and an over-current condition is deemed to exist. The other reference voltage is configured to be equal to Vmin=Imin/Rsense, such that the output of the comparison indicates whether the current is under a selected current limit (Imin). If the antenna is drawing less current than this minimum current limit, then it can be inferred that the antenna has become disconnected or has otherwise failed causing an open circuit, and, an under-current condition exists. It is noted that for these reference voltage equations, as with the reference voltage equation above, Rsense is the values selected for resistors (R1, R2) 210 and 212. The table below provides an example for the current limiting parameters as determined by the size selected for the two Rsense resistors (R1, R2) 210 and 212.

TABLE 1

Current Limiting Range vs. Resistor Sizes (R1, R2)

| R1 and R2 (ohms) | $I_{MIN}$ (milli-Amps) | $I_{MAX}$ (milli-Amps) |
|---|---|---|
| 0.100 | 100 | 2000 |
| 0.220 | 45 | 910 |
| 0.470 | 21 | 425 |
| 1.0 | 10 | 200 |

With respect to voltage detection functionality, the current/voltage detector circuitry 204 also determines whether over-voltage error conditions exist. In particular, within the current/voltage detector circuitry 204, SANT and TANT are compared to the positive supply voltage ($V_{DD}$) to determine if either of these two voltages exceeds $V_{DD}$. If this is determined to be the case, it can be inferred that an external short-to-battery condition or some other over-voltage error conditions exists.

Figure 3:
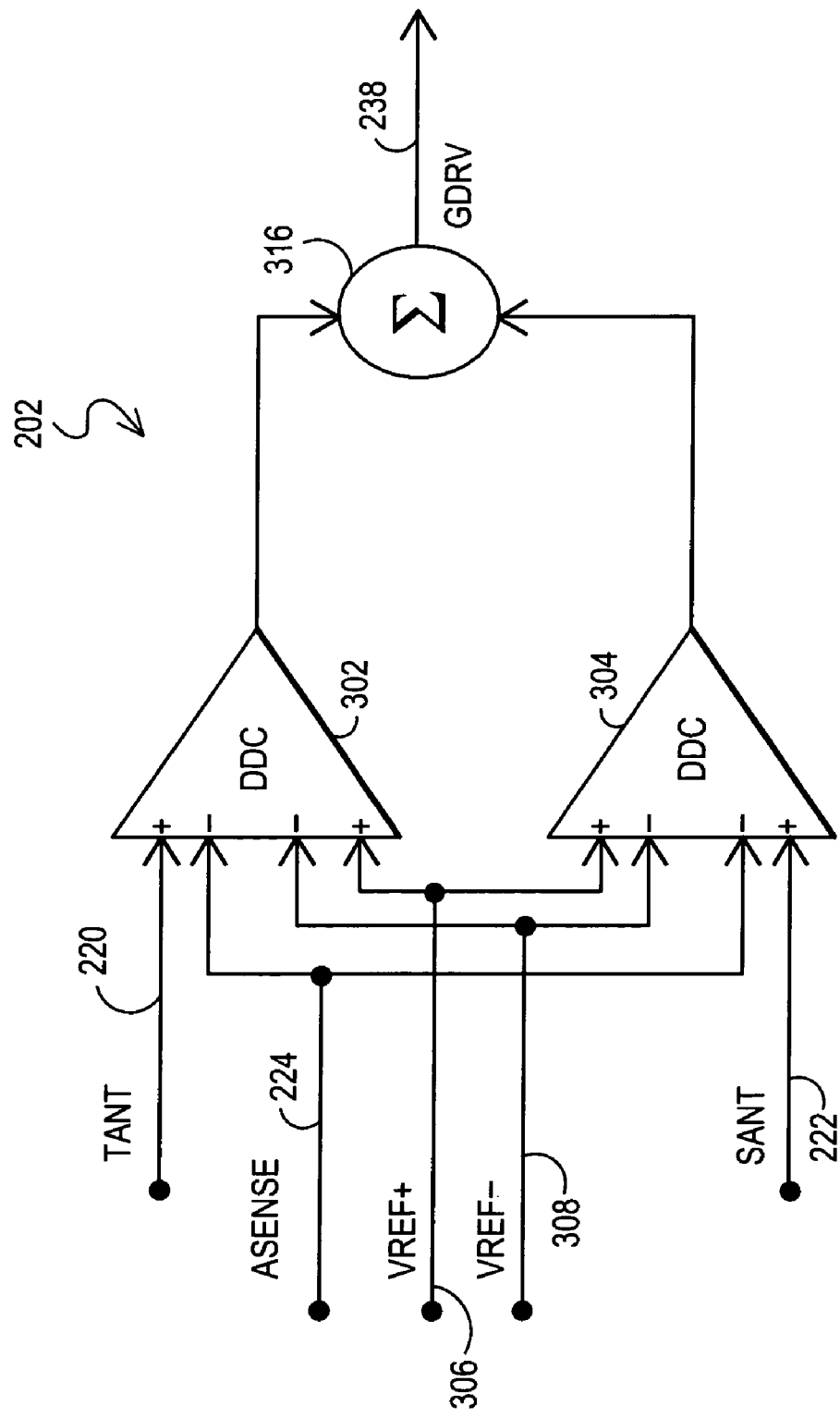
FIG. 3 is a circuit diagram for an example embodiment of the current limiter circuitry.

FIG. 3 is a circuit diagram for an example embodiment of the current limiter circuitry 202. In this embodiment, dual differential comparator (DDC) 302 and DDC 304 are utilized to provide voltage comparisons. In particular, at its first differential input, DDC 302 receives the TANT signal 220 as the positive input signal and the ASENSE signal 224 as the negative input signal. At its second differential input, DDG 302 receives positive reference voltage signal (VREF+) 306 and negative reference voltage signal (VREF−) 308 at the positive and negative inputs, respectively. With respect to DDC 304, at its first differential input, DDC 304 receives the SANT signal 222 as the positive input signal and the ASENSE signal 224 as the negative input signal. At its second differential input, DDC 304 receives positive reference voltage signal (VREF+) 306 and negative reference voltage signal (VREF−) 308 at the positive and negative inputs, respectively. The outputs of DDC 302 and DDC 304 are provided to summation circuit 316 where they are summed together to provide the GDRV signal 238. It is noted that the reference voltage signals 306 and 308 can be, for example, signals with a voltage difference of about 200 mV. In operation, if the antenna subsystems start to draw too much current, the current limiter circuitiy 202 acts to limit the current through the current limiting transistor (Q1) 206 by increasing the voltage of the GDRV signal 238 thereby limiting the current that can flow through the current limiting transistor (Q1) 206. In an extreme condition, the current limiting transistor (Q1) 206 can be turned off completely.

Figure 4:
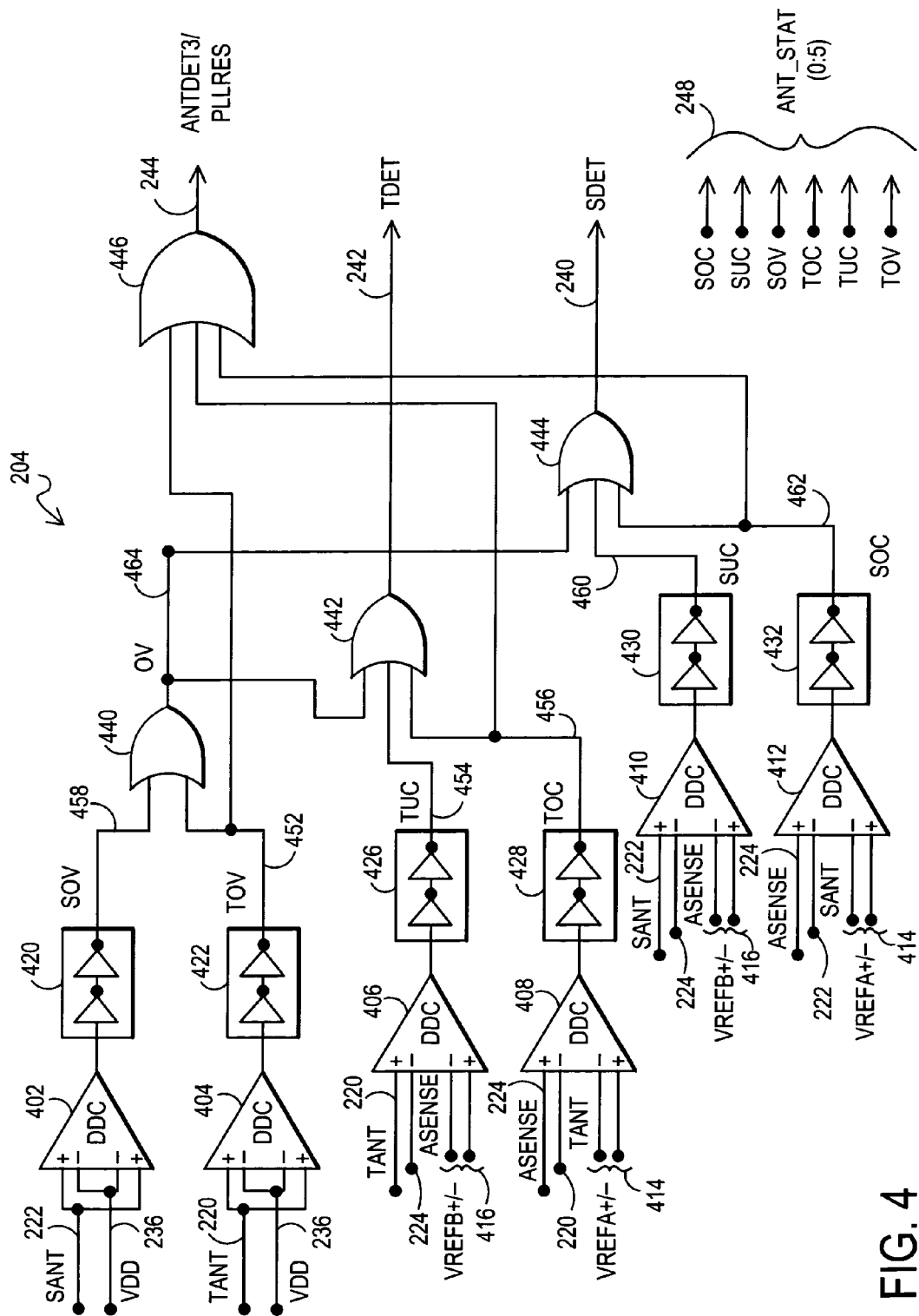
FIG. 4 is a circuit diagram for an example embodiment of the current/voltage detector circuitry.

FIG. 4 is a circuit diagram for an example embodiment of the current/voltage detector circuitry 204. In this embodiment, as with FIG. 3 above, a number of DDCs 402, 404, 406, 408, 410 and 412 are used to make voltage comparisons. In particular, DDCs 402 and 404 are utilized to provide over-voltage detection for each of the antennas described with respect to FIG. 2 above. DDCs 406 and 408 are utilized to provide under-current and over-current detection for one of the antennas (terrestrial). And DDCs 410 and 412 are utilized to provide under-current and over-current detection for the other antenna (satellite). The outputs of these DDCs can be passed through buffers 420, 422, 426, 428, 430 and 432, respectively, and these buffers can be implemented as two inverters, if desired. As depicted, the buffer outputs provide the antenna status signals that make up the ANT_STAT (antenna status) signals 248 and that are loaded into six bits (0:5) of an on-chip antenna status register. As shown at the bottom right of FIG. 4, these ANT_STAT signals 248 include the terrestrial antenna over-voltage detection signal (TOV) 452, the terrestrial under-current detection signal (TUC) 454, the terrestrial over-current detection signal (TOC) 456, the satellite antenna over-voltage detection signal (SOV) 458, the satellite under-current detection signal (SUC) 460, and the satellite over-current detection signal (SOC) 462.

As indicated above, DDCs 402, 404, 406, 408, 410 and 412 are utilized in the embodiment of FIG. 4 to generate output signals that are passed through buffers 420, 422, 426, 428, 430 and 432 to provide the ANT_STAT signals 458, 452, 454, 456, 460 and 462, respectively. In particular, DDC 402 receives the SANT signal 222 as the positive input signal and the $V_{DD}$ signal 236 as the negative input signal at both its differential inputs. DDC 404 receives the TANT signal 220 as the positive input signal and the $V_{DD}$ signal 236 as the negative input signal at both its differential inputs and outputs a signal to the buffer 422 that becomes the TOV signal 452. DDC 406 receives the TANT signal 220 as the positive input signal and the ASENSE signal 224 as the negative input signal for its first differential input, and DDC 406 receives positive and negative reference B voltage (VREFB+/−) signals 416 at the positive and negative inputs for its second differential input, respectively. DDC 408 receives the ASENSE signal 224 as the positive input signal and the TANT 220 signal as the negative input signal for its first differential input, and DDC 408 receives positive and negative reference A voltage (VREFA+/−) signals 414 at the positive and negative inputs for its second differential input, respectively. DDC 410 receives the SANT signal 222 as the positive input signal and the ASENSE signal 224 as the negative input signal for its first differential input, and DDC 410 receives positive and negative reference B voltage (VREFB+/−) signals 416 at the positive and negative inputs for its second differential input, respectively. DDC 412 receives the ASENSE signal 224 as the positive input signal and the SANT 222 signal as the negative input signal for its first differential input, and DDC 412 receives positive and negative reference A voltage (VREFA+/−) signals 414 at the positive and negative inputs for its second differential input, respectively. It is noted that the reference voltage (VREFA+/−) signals 414 can be, for example, signals with a voltage difference of about 100 mV and that DDCs 408 and 412 are configured to detect antenna currents over 200 mA. It is also noted that the reference voltage (VREFB+/−) signals 416 can be, for example, signals with a voltage difference of about 10 mV and that DDCs 406 and 410 are configured to detect antenna currents under 20 mA.

In addition to loading the antenna status signals 458, 452, 454, 456, 460 and 462 into a register, logic circuitry can also be used to process these status signals and to provide output signals indicating detected error states. As depicted, OR gate 440 receives the SOV signal 458 and the TOV signal 452 and outputs an over-voltage (OV) signal 464. OR gate 442 receives the OV signal 464, the TUC signal 454 and the TOC signal 456 and outputs the TDET signal 242. OR gate 444 receives the OV signal 464, the SUC signal 460 and the SOC signal 462 and outputs the SDET signal 240. Finally, OR gate 446 receives the TOV signal 452, the TOC signal 456 and the SOC signal 462 and outputs the ANTDET3/PLL-RES signal 244. As depicted, the logic circuitry provides that the ANTDET3 signal 244 is logic high on the occurrence of a terrestrial over-voltage (TOV) condition, a terrestrial over-current (TOC) condition or a satellite over-current (SOC) condition. The TDET signal 242 is a logic high on the occurrence of an over-voltage (OV) condition, a terrestrial under-current (TUC) condition or a terrestrial over-current (TOC) condition. And the SDET signal 240 is a logic high on the occurrence of an over-voltage (OV) condition, a satellite under-current (SUC) condition or a satellite over-current (SOC) condition. As shown in FIG. 2, the three signals made up of the TDET signal 242, the SDET signal 240 and the ANTDET3/PLLRES signal 244 can be provided to external pins. The following table provides an example fault detection conditions that can be indicated by these external pins if the logic circuitry of FIG. 4 is utilized. It is noted that the first two rows relate to the operation of a phase-locked-loop (PLL) that is expected to be within the frequency synthesizer 106, as described further below.

TABLE 2

Example Pin States for Detected Antenna Fault Conditions

| TDET | SDET | ANTDET3/PLLRES | Error Condition |
|---|---|---|---|
| 0 | 0 | 0 | Normal functioning for PLL within frequency synthesizer 106 |
| 0 | 0 | 1 | PLL reset |
| 0 | 1 | 0 | Satellite antenna under-current |
| 0 | 1 | 1 | Satellite antenna over-current |
| 1 | 0 | 0 | Terrestrial antenna under-current |
| 1 | 0 | 1 | Terrestrial antenna over-current |
| 1 | 1 | 0 | Satellite antenna over-voltage |
| 1 | 1 | 1 | Terrestrial antenna over-voltage |

It is noted that the logic of FIG. 4, as depicted, is designed to provide accurate error indications for conditions where only one antenna error has occurred. For conditions where there are multiple simultaneous failures on a single antenna or simultaneous failures on both the terrestrial and the satellite antennas, the status of the SANT/TANT/PLLRES pins become undefined. In such a case, however, as described above, the antenna status register could still be accessed to determine the states of the antenna status signals (ANT_STAT) 248. It is further noted that the other solutions could be designed, if desired, for providing indications of antenna failures. For example, additional logic, registers and/or output pins could be utilized so that that multiple simultaneous failures could be reported. Thus, other configurations could be implemented, and the embodiment set forth in FIG. 4 and TABLE 2 are intended as one example.

As indicated above, therefore, other operational modes could be utilized other than those provided by the circuitry described above. For example, with respect to FIG. 4, the circuitry could be designed to provide a simple error detect mode rather than provide the detailed error conditions set forth in TABLE 2 above. In such a simple error detect mode, logic circuitry could be utilized such that the SDET and TDET pins indicate whether any error condition has been identified for the satellite antenna and the terrestrial antenna, respectively. The on-chip antenna status register, which holds the ANT_STAT status bits 248, can then be accessed through an external communication interface for the integrated circuit so that external circuitry can determine which antenna error condition has actually occurred. The following table provides an example of this simple detect mode operation.

TABLE 3

Example Pin States for Simple Error Detect Mode

| TDET | SDET | Error Condition |
|---|---|---|
| 0 | 0 | Normal operation |
| 1 | 0 | Fault condition on the terrestrial antenna |

TABLE 3-continued

Example Pin States for Simple Error Detect Mode

| TDET | SDET | Error Condition |
|---|---|---|
| 0 | 1 | Fault condition on the satellite antenna |
| 1 | 1 | Fault conditions on both antennas |

As indicated above, the ANTDET3/PLLRES pin 244 can be used for dual purposes, if desired. In addition, the SDET pin 240 and the TDET pin 242 can also be used for dual purposes if desired. As shown in FIG. 4, the radio receiver integrated circuit 100 communicates with the frequency synthesizer 106 and the radio processor 104. One input pin on the frequency synthesizer integrated circuit 106 can be a reset pin that causes the on-chip oscillator, which includes a PLL, to reset or re-calibrate itself. During operation, there are times when the radio receiver 100 will need to apply a PLLRES signal to the frequency synthesizer 106. Thus, there is a PLLRES pin on the radio receiver integrated circuit 100 for this purpose. Under certain antenna error conditions, however, the radio receiver 100 and/or the radio processor 104 cannot be expected to properly function. At these times, therefore, it is not important for the PLL to be running. Thus, the PLLRES pin can be used as a status output pin to help distinguish among various error conditions. An example of such a dual use along with the TDET and SDET pins to distinguish error conditions is set forth in TABLE 2 above. It is additionally noted that the SDET and TDET pins 240 and 242 can also be used for dual purposes if desired. For example, of a mode select pin is asserted on the radio receiver integrated circuit 100, the SDET and TDET pins 240 and 242 can be used as part of a serial interface that includes a serial clock (SCLK) input pin, a serial data input (SDI) pin and serial data output (SDO) pin. For example, the SDET pin 240 can be used as the SDO pin, and the TDET pin 242 can be used as the SCLK pin.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An antenna error detection and circuit protection system, comprising:
    a current limit detection circuit integrated within an integrated radio receiver and configured to detect current levels drawn by at least one antenna mounted remotely from the integrated radio receiver, the current limit detection circuit having a gate drive signal as an output; and
    a current limiting pass transistor having its source and drain coupled between a supply voltage and an antenna and having its gate coupled to the gate drive signal;

wherein the current limit detection circuit is configured to adjust the gate drive signal to reduce current flow through the pass transistor when the detected current level drawn by the at least one antenna rises above a current limit level;

wherein a terrestrial antenna and a satellite antenna are coupled to the current limit detection circuit and to the current limiting pass transistor;

wherein the integrated radio receiver includes a terrestrial antenna input pin, a satellite antenna input pin, and an antenna sense input pin; and wherein the terrestrial antenna is coupled to the terrestrial antenna input pin, the satellite antenna is coupled to the satellite antenna input pin, and the terrestrial and satellite antennas are both coupled to the antenna sense input pin.

2. The system of claim 1, wherein the current limiting pass transistor is an external transistor device.

3. The system of claim 1, wherein the current limiting pass transistor is a transistor device integrated within the integrated radio receiver.

4. The system of claim 1, further comprising a voltage protection device coupled between the current limiting transistor and the at least one antenna.

5. The system of claim 1, wherein the terrestrial and satellite antennas are coupled to the antenna sense input pin through a first and second resistors.

6. The system of claim 5, wherein the first and second resistors are matched and are selected to determine the current limit level.

7. The system of claim 1, wherein a first circuit protection resistor is coupled to the terrestrial antenna input pin, a second circuit protection resistor is coupled to the satellite antenna input pin, and a third protection resistor is coupled to the antenna sense input pin.

8. The system of claim 7, wherein the first circuit protection resistor is coupled between the terrestrial antenna and the terrestrial antenna input pin, the second circuit protection resistor is coupled between the satellite antenna and the satellite antenna input pin, and the third protection resistor is coupled between the terrestrial and satellite antennas and the antenna sense input pin.

9. The system of claim 8, wherein the first, second and third resistors are matched.

10. The system of claim 1, wherein on-chip current sinks are coupled to each of the terrestrial antenna input pin, the satellite antenna input pin, and the antenna sense input pin.

11. The system of claim 1, wherein at least one on-chip protection diode is coupled to the terrestrial antenna input pin, at least one on-chip protection diode is coupled to the satellite antenna input pin, and at least one on-chip protection diode is coupled to the antenna sense input pin.

12. An antenna error detection and circuit protection system, comprising:

a current and voltage detection circuit integrated within an integrated radio receiver and configured to detect current and voltage levels drawn by at least one antenna mounted remotely from the integrated radio receiver, the current and voltage detection circuit configured to determine under-current, over-current, and over-voltage antenna error conditions; and at least one antenna error output pin for the integrated radio receiver, the antenna error output pin providing an output signal indicative of an antenna error condition;

wherein a terrestrial antenna and a satellite antenna are coupled to the current and voltage detection circuit, the current and voltage detection circuit being configured to determine under-current, over-current, and over-voltage antenna error conditions for the terrestrial antenna and the satellite antenna.

13. The system of claim 12, wherein the antenna error output pin is configured to transition from a first logic state to a second logic state upon an occurrence of an antenna error condition.

14. The system of claim 12, wherein the current and voltage detection circuit is configured to provide error flags for an on-chip register within the integrated radio receiver, the error flags being configured to represent an occurrence of the under-current, over-current, and over-voltage antenna error conditions.

15. The system of claim 12, wherein the integrated radio receiver includes a terrestrial antenna input pin, a satellite antenna input pin, and an antenna sense input pin, and wherein the terrestrial antenna is coupled to the terrestrial antenna input pin, the satellite antenna is coupled to the satellite antenna input pin, and the terrestrial and satellite antennas are both coupled to the antenna sense input pin.

16. The system of claim 15, wherein a first circuit protection resistor is coupled to the terrestrial antenna input pin, a second circuit protection resistor is coupled to the satellite antenna input pin, and a third protection resistor is coupled to the antenna sense input pin.

17. The system of claim 16, wherein the protection resistors are integrated within the integrated radio receiver.

18. The system of claim 12, wherein a first antenna error output pin is configured to transition from a first logic state to a second logic state upon an occurrence of the terrestrial antenna error condition, and a second antenna error output pin is configured to transition from a first logic state to a second logic state upon an occurrence of the satellite antenna error condition.

19. The system of claim 18, wherein the current and voltage detection circuit is configured to provide error flags for an on-chip register within the integrated radio receiver, the error flags being configured to represent an occurrence of the under-current, over-current, and over-voltage antenna error conditions for the terrestrial antenna and the satellite antenna.

20. The system of claim 12, wherein three output pins for the integrated radio receiver are configured to provide a 3-bit output signal, the 3-bit output signal identifying what antenna error condition has occurred upon occurrence of an under-current, over-current, and over-voltage antenna error.

21. The system of claim 20, wherein at least one of the three output pins are utilized for dual purposes for the integrated radio receiver.

22. The system of claim 21, wherein at least two of the three pins are utilized to provide at least part of a serial interface.

23. The system of claim 21, wherein at least one of the three pins is utilized to provide a reset signal to an external frequency synthesizer circuit.

24. A method for detecting errors in and protecting antenna circuitry, comprising:

providing an integrated radio receiver including a terrestrial antenna input pin, a satellite antenna input pin, and an antenna sense input pin;

coupling the terrestrial antenna to the terrestrial antenna input pin, the satellite antenna to the satellite antenna input pin, and both the terrestrial and satellite antennas to the antenna sense input pin;

detecting current levels drawn by at least one antenna mounted remotely from the integrated radio receiver;

generating a gate drive signal based upon the detected current levels;

controlling current through a current limiting pass transistor with the gate drive signal, the current limiting pass transistor having its source and drain coupled between a supply voltage and an antenna and having its gate coupled to the gate drive signal; and adjusting the gate drive signal to reduce current flow through the pass transistor when the detected current level drawn by the at least one antenna rises above a current limit level;

wherein a terrestrial antenna and a satellite antenna are coupled to the current limiting pass transistor.

25. The method of claim 24, wherein the current limiting pass transistor is an external transistor device.

26. The method of claim 24, wherein the current limiting pass transistor is a transistor device integrated within the integrated radio receiver.

27. The method of claim 24, further comprising providing a voltage protection device coupled between the current limiting transistor and the at least one antenna.

28. A method for detecting errors in and protecting antenna circuitry, comprising:

detecting current levels drawn by at least one antenna mounted remotely to an integrated radio receiver to determine under-current, over-current, and over-voltage antenna error conditions;

detecting voltage levels drawn by at least one antenna mounted remotely from the integrated radio receiver to determine under-current, over-current, and over-voltage antenna error conditions; and utilizing at least one antenna error output pin for the integrated radio receiver to provide an output signal indicative of an antenna error condition;

wherein a terrestrial antenna and a satellite antenna are coupled to the integrated radio receiver and wherein the detecting steps comprise detecting current and voltage levels for both the terrestrial antenna and the satellite antenna.

29. The method of claim 28, further comprising transitioning the antenna error output pin from a first logic state to a second logic state upon an occurrence of an antenna error condition.

30. The method of claim 28, further comprising generating error flags for an on-chip register within the integrated radio receiver, the error flags being configured to represent an occurrence of the under-current, over-current, and over-voltage antenna error conditions.

31. The method of claim 28, further comprising utilizing a first antenna error output pin to indicate an occurrence of a terrestrial antenna error condition, and a second antenna error output pin to indicate an occurrence of a satellite antenna error condition.

32. The method of claim 28, further comprising generating error flags for an on-chip register within the integrated radio receiver, the error flags being configured to represent an occurrence of the under-current, over-current, and over-voltage antenna error conditions for the terrestrial antenna and the satellite antenna.

33. The method of claim 28, utilizing three output pins for the integrated radio receiver to provide a 3-bit output signal, the 3-bit output signal identifying what antenna error condition has occurred upon occurrence of an under-current, over-current, and over-voltage antenna error.

34. The system of claim 33, wherein at least one of the three output pins are utilized for dual purposes for the integrated radio receiver.

* * * * *